US007352797B2

(12) United States Patent
Eidson

(10) Patent No.: US 7,352,797 B2
(45) Date of Patent: Apr. 1, 2008

(54) PROCEDURE FOR BPSK MODULATION WITH REDUCED ENVELOPE PEAKING

(75) Inventor: Donald Brian Eidson, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 747 days.

(21) Appl. No.: 10/611,325

(22) Filed: Jun. 30, 2003

(65) Prior Publication Data
US 2004/0264551 A1 Dec. 30, 2004

(51) Int. Cl.
*H04B 1/707* (2006.01)
*H04L 27/20* (2006.01)

(52) U.S. Cl. .................. 375/146; 375/308

(58) Field of Classification Search ........ 375/140–146, 375/279, 282, 308; 332/103; 370/335
See application file for complete search history.

(56) References Cited

U.S. PATENT DOCUMENTS

| | | | |
|---|---|---|---|
| 4,817,116 A | | 3/1989 | Akaiwa et al. |
| 5,103,459 A | | 4/1992 | Gilhousen et al. |
| 5,416,801 A | * | 5/1995 | Chouly et al. .............. 375/260 |
| 5,621,762 A | | 4/1997 | Miller et al. |
| 5,638,404 A | | 6/1997 | Crozier |
| 6,031,865 A | | 2/2000 | Whinnett et al. |
| 6,862,321 B2 | * | 3/2005 | Kaneko et al. ............. 375/296 |
| 6,865,236 B1 | * | 3/2005 | Terry ........................... 375/279 |
| 6,934,317 B1 | * | 8/2005 | Dent ............................ 375/140 |
| 6,940,837 B1 | * | 9/2005 | Kotake ........................ 370/335 |
| 2002/0114398 A1 | * | 8/2002 | Lin et al. ..................... 375/253 |
| 2005/0193307 A1 | * | 9/2005 | Wengerter et al. .......... 714/749 |

OTHER PUBLICATIONS

Miller, S.L. and O'Dea, R.J., "*Peak Power and Bandwidth Efficient Linear Modulation*," IEEE Transactions on Communications, vol. 46, No. 12, pp. 1639-1648, Dec. 1998.
Kashyap, K. et al., "*PI/2-Shift BPSK—A Modulation Scheme Robust to Nonlinear Amplification for CDMA Mobile Communications*," IEICE Transactions on Fundamentals of Electronics, Communications and Computer Sciences, vol. E80-A, No. 9, pp. 1634-1639, Sep. 1997.
Kashyap, K. et al., "*The Performance of CDMA System Using Pi/4-Shift QPSK and Pi/2-Shift BPSK With the Nonlinearity of HPA*," IEEE International Symposium on Personal, Indoor and Mobile Radio Communications, pp. 492-496, Oct. 15, 1996.
Fujita, et al., "*Sony CFP Presentation*," IEEE P802.15 Working Group for Wireless Personal Area Networks, doc No. IEEE P802. 15-03137r3, pp. 1-36, May 5, 2003.

(Continued)

*Primary Examiner*—Don N Vo
(74) *Attorney, Agent, or Firm*—Howrey LLP

(57) ABSTRACT

A system for and method of mapping successive bits of digital data into BPSK symbols using one or more BPSK symbol constellations such that orthogonal BPSK constellations are applied to successive bits of the digital data. The system and method may toggle between applying first and second orthogonal constellations as successive bits of the digital data are encountered. Alternatively, the system and method may successively rotate by 90° the constellation to be applied as successive bits of the digital data are encountered.

20 Claims, 13 Drawing Sheets

OTHER PUBLICATIONS

Pentenaude, F. et al., "*A New Symbol Timing Tracking Algorithm for Pi/2-BPSK and Pi 4-QPSK Modulations*," IEEE Proceedings of the International Conference on Communications, vol. 4, pp. 1588-1592, Jun. 14, 1992.

Crozier, S.N., "*Precompensated Frequency Modulation (PFM) Designed for 'Pi!/4-Shifted QPSK Receivers*," 18th Biennial Symposium on Communication, pp. 343-346, Jun. 2, 1996.

\* cited by examiner

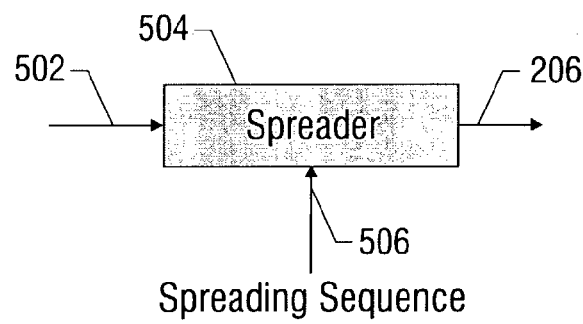
FIG. 5
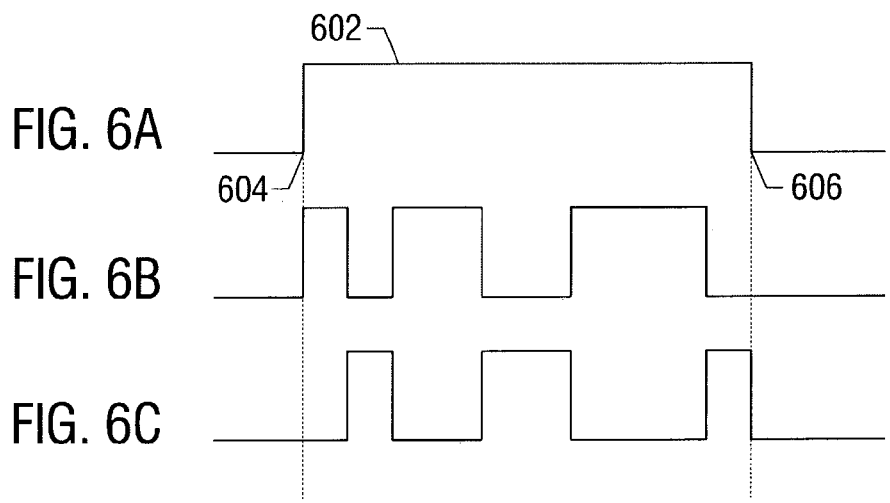
FIG. 6A
FIG. 6B
FIG. 6C
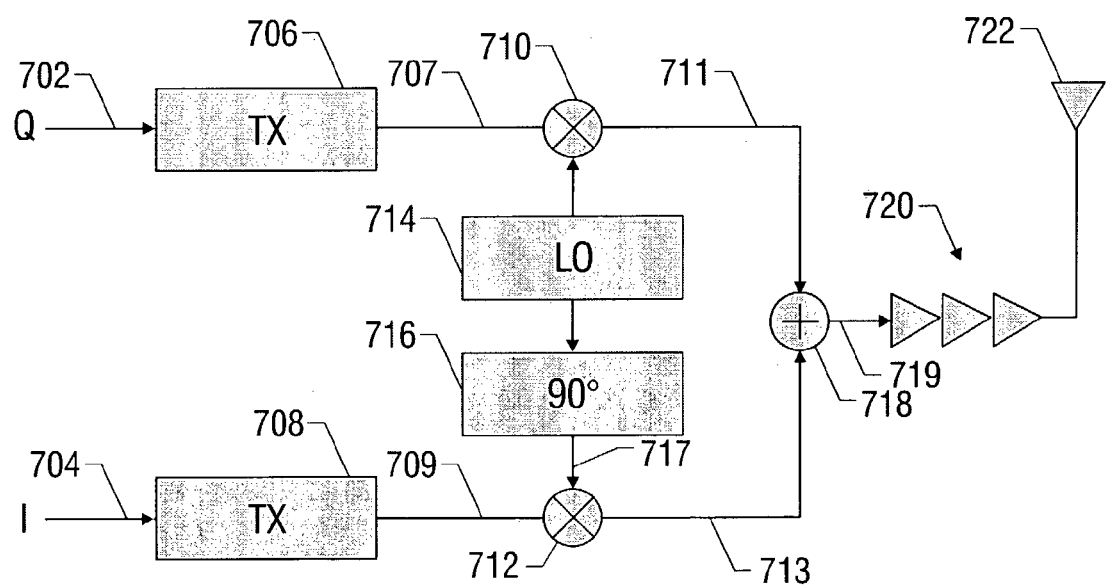
FIG. 7

PROCEDURE FOR BPSK MODULATION WITH REDUCED ENVELOPE PEAKING

FIELD OF THE INVENTION

This invention relates to BPSK symbols, and, more specifically, to procedures for BPSK modulation and mapping digital data into BPSK symbols.

RELATED ART

BPSK modulation is a robust modulation scheme that is often used in adaptive coding and modulation systems. It is frequently used for communicating with receivers on the edge of coverage. In BPSK modulation, a BPSK symbol mapper maps digital data into BPSK symbols using a BPSK symbol constellation. The BPSK symbol constellation is typically represented on a Cartesian coordinate plane in which one of the coordinates represents the in-phase (I) component of the BPSK symbol, and the other of the coordinates represents the quadrature (Q) component of the BPSK symbol.

A quadrature modulator then modulates a carrier signal with the I and Q components of the BPSK symbol. In a quadrature modulator, each component is passed through a pulse-shaping filter, and then up-converted to the transmission frequency using local oscillator signals which are 90° out of phase with one another. The up-converted components are summed, and the ensuing signal is then passed through a power amplifier and transmitted over a wireless interface.

The pulse-shaping filter in a quadrature modulator is typically implemented as a (square) root-raised cosine pulse-shaping filter. For BPSK symbols, the root-raised cosine pulse-shaping filter increases the peak amplitude of the envelope of the signal that is input to the power amplifier. This in turn requires a reduction in the average power of the signal that can be transmitted at the same distortion level, which in turn limits the range of the signal. Alternatively, or in addition, it increases the quiescent power that must be consumed by the power amplifier in order to avoid an increase in the distortion introduced by the power amplifier.

FIG. 1 compares the envelope peaking that is introduced into BPSK, QPSK, and 8-PSK symbol modulation by a root-raised cosine filter having a roll-off factor of 0.25. Curve 102 represents the probability distribution of the envelope peak of a BPSK-modulated signal referenced to average power (expressed in dBc). Curve 104 does so for QPSK-modulated signals, and curve 106 does so for an 8-PSK modulated signals.

These curves illustrate that the envelope peaking that is introduced by the filter into BPSK-modulated symbols substantially exceeds that of the other two modulation schemes. Curve 102, for example, indicates there is about a 1% probability that the envelope peak to average ratio for a BPSK-modulated signal will exceed 4.3 dB, and curve 104 indicates that there is about a 1% probability the envelope peak to average ratio for a QPSK-modulated signal will exceed 3.4 dB. That means that, compared with QPSK symbols, BPSK symbols must be transmitted at 0.9 dB less average power when the fidelity criterion which is applicable is not to clip any more than 1% of the envelope peaks for either modulation scheme. Expressed another way, the average transmit power for BPSK symbols has a relative back-off of 0.9 dB compared to QPSK symbols. That in turn limits the range of BPSK symbols relative to QPSK symbols when transmitted over a wireless interface.

SUMMARY OF THE INVENTION

A system for mapping digital data into BPSK symbols is described. First logic maps successive bits of the digital data into successive BPSK symbols using one or more BPSK constellations. Second logic provides the one or more BPSK constellations to be applied by the first logic, such that orthogonal BPSK constellations are applied to successive bits of the digital data.

The digital data may be any digital data, including but not limited to digital baseband data representing information to be transmitted to a destination, digital data derived from or comprising data spread in frequency with a spreading sequence, or digital data derived from or comprising differentially encoded data.

In one embodiment, third logic toggles a bit between first and second states as successive bits of the digital data are encountered. If the state bit is in the first state, the second logic provides a first BPSK constellation to be applied by the first logic. If the state bit is in the second state, the second logic provides a second BPSK constellation to be applied by the first logic, wherein the second BPSK constellation is orthogonal to the first. In a second embodiment, the second logic successively rotates by 90° the BPSK constellation to be applied by the first logic as successive bits of the digital data are encountered.

A method of mapping digital data into BPSK symbols is also described. The method comprises mapping a bit of the digital data into a BPSK symbol using a first BPSK constellation, and mapping a next successive bit of the digital data into a BPSK symbol using a second BPSK constellation orthogonal to the first.

In one embodiment, the method toggles between the first and second constellations as successive bits of the digital data are encountered. In a second embodiment, the method successively rotates by 90° the constellation to be applied as successive bits of the digital data are encountered.

Other or related systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 5 is a block diagram of a spreader for spreading input bits in frequency through application of a spreading sequence.

FIGS. 6A-6C illustrate an example of spreading an input bit by XORing it with a 10 chip spreading sequence.

FIG. 7 is a block diagram of an embodiment of a quadrature modulator.

DETAILED DESCRIPTION

As utilized herein, terms such as "about", "approximately", "substantially" and "near" are intended to allow some leeway in mathematical exactness to account for tolerances that are acceptable in the trade. Accordingly, any deviations upward or downward from the value modified by the terms "about", "approximately", "substantially" or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "logic" refers to implementations of functionality in hardware, software, or any combination of hardware and software.

Figure 2:
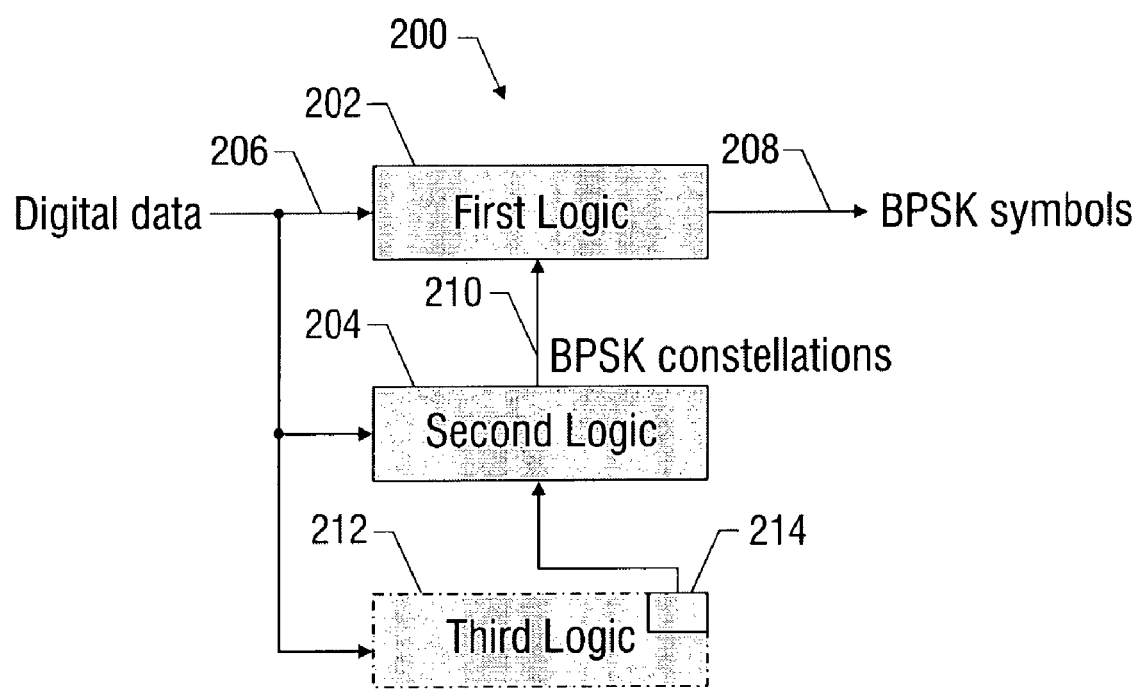
FIG. 2 is a block diagram of an embodiment of a system for mapping digital data into BPSK symbols such that orthogonal BPSK constellations are applied to successive bits of the digital data.

FIG. 2 illustrates an embodiment 200 of a system for mapping digital data into BPSK symbols. The system comprises first logic 202 for mapping successive bits of the digital data 206 into successive BPSK symbols 208 using one or more BPSK constellations 210. The system further comprises second logic 204 for providing the one or more BPSK constellations 210 to be applied by the first logic 202 in mapping successive bits of the digital data 206 into BPSK symbols 208 such that orthogonal BPSK constellations are applied in mapping successive bits of the digital data 206.

In one implementation, the system 200 further comprises third logic 212 (illustrated in phantom in FIG. 2) for toggling a bit 214 between first and second states as successive bits of the digital data are encountered, wherein the second logic 204 provides a first constellation to be applied by the first logic 202 if the bit 214 is in the first state, and provides a second constellation orthogonal to the first to be applied by the first logic 202 if the bit 214 is in the second state. As a result, the system toggles between applying the first and second constellations as successive bits of the digital data are encountered.

Figure 3A:
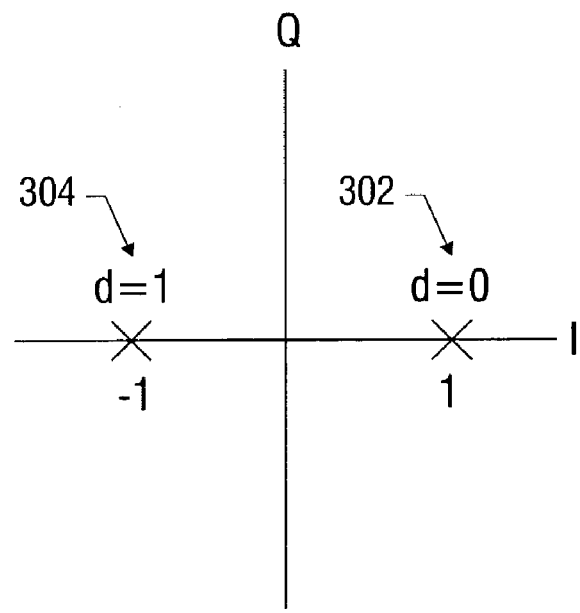
FIGS. 3A and 3B illustrate an example of first and second BPSK symbol constellations that are orthogonal to one another.
Figure 3B:
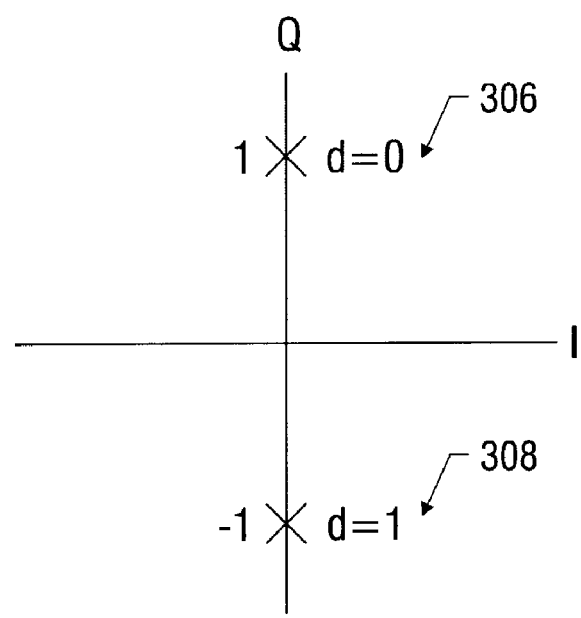

An example of the first constellation that may be applied in this implementation is illustrated in FIG. 3A, and an example of the second constellation that may be applied in this implementation is illustrated in FIG. 3B. Both constellations contemplate that the BPSK symbols 208 provided by the first logic 202 can be represented as orthogonal in-phase (I) and quadrature (Q) components.

As illustrated, in the constellation of FIG. 3A, as indicated by identifying numeral 302, a logical '0' digital data bit is mapped into a BPSK symbol having a I component of 1 and a Q component of 0, and, as indicated by identifying numeral 304, a logical '1' digital data bit is mapped into a BPSK symbol having a I component of −1 and a Q component of 0. In the constellation of FIG. 3B, as indicated by identifying numeral 306, a logical '0' digital data bit is mapped into a BPSK symbol having an I component of 0 and a Q component of 1, and, as indicated by identifying numeral 308, a logical '1' digital data bit is mapped into a BPSK symbol having an I component of 0 and a Q component of −1.

In the particular example illustrated, the constellation of FIG. 3B is the constellation of FIG. 3A rotated counter-clockwise by 90°. However, it should be appreciated that other examples are possible as long as the two constellations are orthogonal to one another, so nothing in the foregoing should be taken as limiting. For example, the second constellation may be the first constellation rotated clockwise by 90° rather than counter-clockwise.

In a second implementation, the second logic 204 is configured to rotate the constellation to be applied by the first logic 202 by 90° as successive bits of the digital data are encountered. In one example of this implementation, the system applies in succession the four constellations illustrated in FIGS. 4A-4D as successive bits of the digital data are encountered. Each of these constellations is rotated counter-clockwise by 90° compared to the previously illustrated constellation.

Figure 4A:
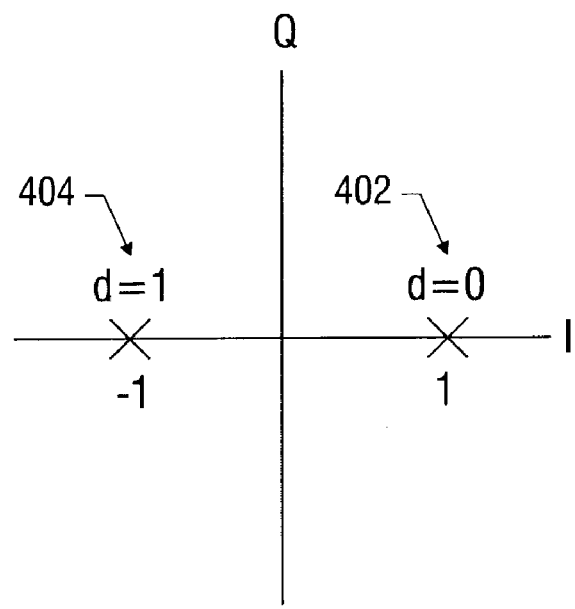
FIGS. 4A, 4B, 4C and 4D illustrate four BPSK symbol constellations that are progressively rotated counterclockwise by 90° relative to one another.

In the constellation of FIG. 4A, as indicated by identifying numeral 402, a logical '0' data bit is mapped into a BPSK symbol having an I component of 1 and a Q component of 0, and, as indicated by identifying numeral 404, a logical '1' data bit is mapped into a BPSK symbol having an I component of −1 and a Q component of 0.

Figure 4B:
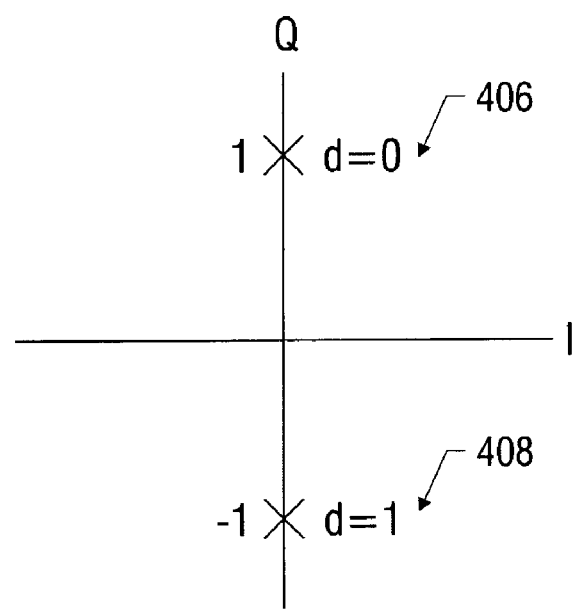

In the constellation of FIG. 4B, as indicated by identifying numeral 406, a logical '0' data bit is mapped into a BPSK symbol having an I component of 0 and a Q component of 1, and, as indicated by identifying numeral 408, a logical '1' data bit is mapped into a BPSK symbol having an I component of 0 and a Q component of −1.

Figure 4C:
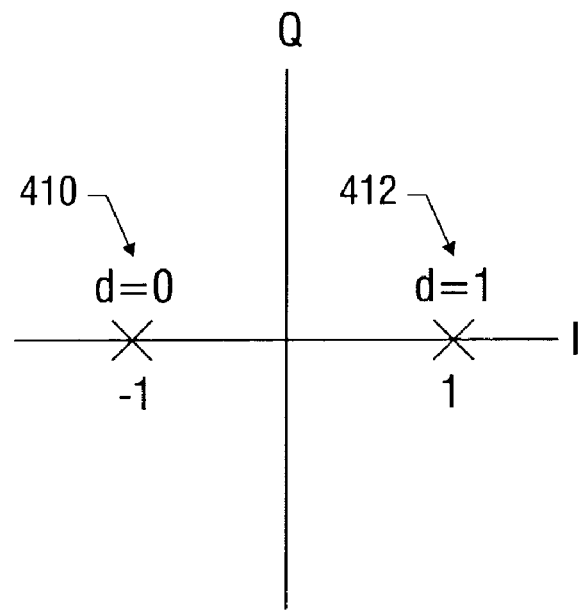

In the constellation of FIG. 4C, as indicated by identifying numeral 410, a logical '0' data bit is mapped into a BPSK symbol having an I component of −1 and a Q component of 0, and, as indicated by identifying numeral 412, a logical '1' data bit is mapped into a BPSK symbol having an I component of 1 and a Q component of 0.

Figure 4D:
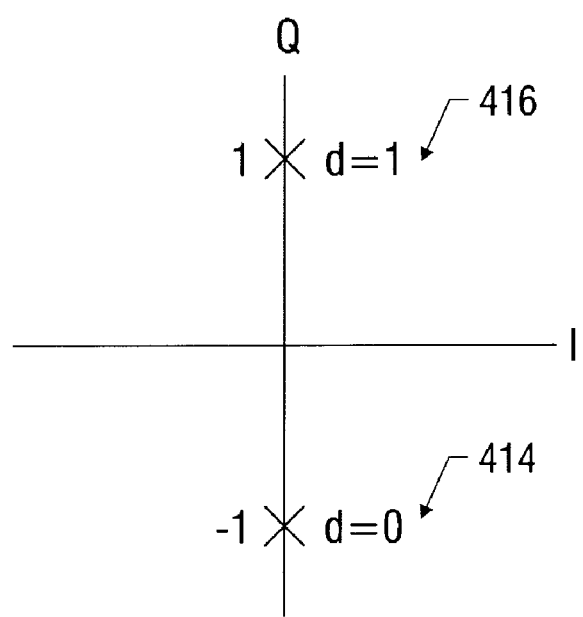

In the constellation of FIG. 4D, as indicated by identifying numeral 414, a logical '0' data bit is mapped into a BPSK symbol having an I component of 0 and a Q component of −1, and, as indicated by identifying numeral 416, a logical '1' data bit is mapped into a BPSK symbol having an I component of 0 and a Q component of 1.

In the particular example illustrated, the successive constellations are progressively rotated counterclockwise by 90°. However, it should be appreciated that other examples are possible as long as the four constellations are orthogonal to one another, so nothing in the foregoing should be taken as limiting. For example, the successive constellations may be progressively rotated clockwise by 90° rather than counter-clockwise. Other examples are also possible in which the four constellations illustrated in FIGS. 4A-4D are applied in any order.

The digital data 206 input to the system of FIG. 2 may be any digital data, including but not limited to baseband data representing information to be transmitted to a destination, digital data spread in frequency with a spreading sequence, or digital data which has been differentially encoded. FIG. 5 illustrates an embodiment in which the digital data 206 is provided by a spreader 504, which spreads in frequency input data 502 through application of a spreading sequence 506. In one example, the spreading sequence is a 64 chip pseudo-random noise (PN) code, and the spreader 504 XORs each bit of the input data 502 with the PN code to form the digital data 206. In this example, through application of the spreading sequence, each bit in the input data 502 is effectively mapped into 64 BPSK symbols.

FIGS. 6A-6C illustrate an example in which an input bit is spread by XORing it with a 10 chip spreading sequence code. FIG. 6A illustrates the input bit 602, which is a logic '1' between times 604 and 606. FIG. 6B illustrates the 10 chip spreading sequence, which can be represented as '1', '0', '1', '1', '0', '0', '1', '1', '1', '0'. FIG. 6C illustrates the result of XORing the input bit with the spreading sequence. As can be seen, through the application of the spreading sequence, the high frequency content of the input bit has been increased.

Figure 15:
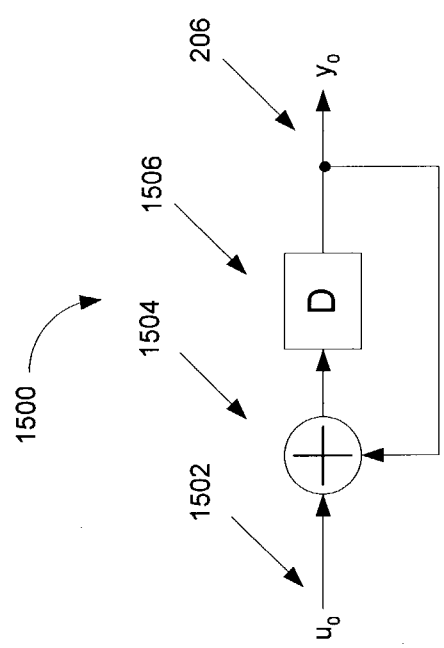
FIG. 15 is a block diagram of an embodiment of a differential encoder for differentially encoding data bits.

FIG. 15 illustrates an embodiment in which the digital data 206 is provided by a differential encoder 1500, which differentially encodes input data 1502 to produce the digital data 206. In one embodiment, the differential encoder 1500 comprises adder 1504 and 1bit accumulator 1506 coupled together as shown, but it should be appreciated that other embodiments are possible, such as where adder 1504 is replaced with an XOR gate.

In one application, the I and Q components of the BPSK symbols output by the system of FIG. 2 are input to a quadrature modulator, which modulates a carrier signal with the I and Q components of a BPSK symbol and transmits the modulated signal over a wireless interface. FIG. 7 is a simplified block diagram of one embodiment of a quadrature modulator. In this particular example, the quadrature modulator includes a direct conversion stage, which up-converts the I and Q components of the input BPSK symbols to the transmission frequency in a single step. However, it should be appreciated that other examples are possible, such as where the I and Q components of the input BPSK symbols are up-converted to the transmission frequency in two steps. In the first step, the components are up-converted to an intermediate frequency. In the second step, the components are up-converted from the intermediate frequency to the transmission frequency.

In FIG. 7, the I component 702 of the BPSK symbol is input to pulse shaping filter 706, and the Q component 704 of the BPSK symbol is input to pulse shaping filter 708. In one implementation, both the filters 706 and 708 are raised cosine pulse shaping filters, but it should be appreciated that other examples are possible.

The output 707 of pulse shaping filter 706 is up-converted to the transmission frequency through mixer 710, which mixes the output 707 with a signal provided by local oscillator 714. In this particular example, the frequency of the signal provided by the local oscillator 714 is set to or near the transmission frequency.

The signal provided by local oscillator 714 is shifted in phase by 90° through phase-shifter 716. The output 709 of pulse shaping filter 708 is up-converted to the transmission frequency through mixer 712, which mixes the output 709 with the phase-shifted signal 717 provided by phase-shifter 716.

The output 711 of mixer 710 is passed through a high-pass filter (not shown) to filter out an unwanted negative frequency component. Similarly, the output 713 of mixer 712 is passed through a high-pass filter (not shown) to filter out an unwanted frequency component. The filtered signals are added by adder 718, and the output 719 of the adder 718 amplified by power amplifier 720. The amplified signal is then transmitted over a wireless interface through antenna 722.

In this particular application, even assuming the pulse shaping filters 706 and 708 are root-raised cosine filters, reduced envelope peaking occurs compared to conventional BPSK symbol modulation because the BPSK constellations which are successively applied over successive symbol periods are orthogonal to one another. Because the successive BPSK symbol constellations are orthogonal to one another, the incidence of the occurrence of the same BPSK symbol (or symbol components) over successive symbol periods on the same signal line is reduced. This is the occurrence that leads to enhanced envelope peaking to begin with.

Figure 8:
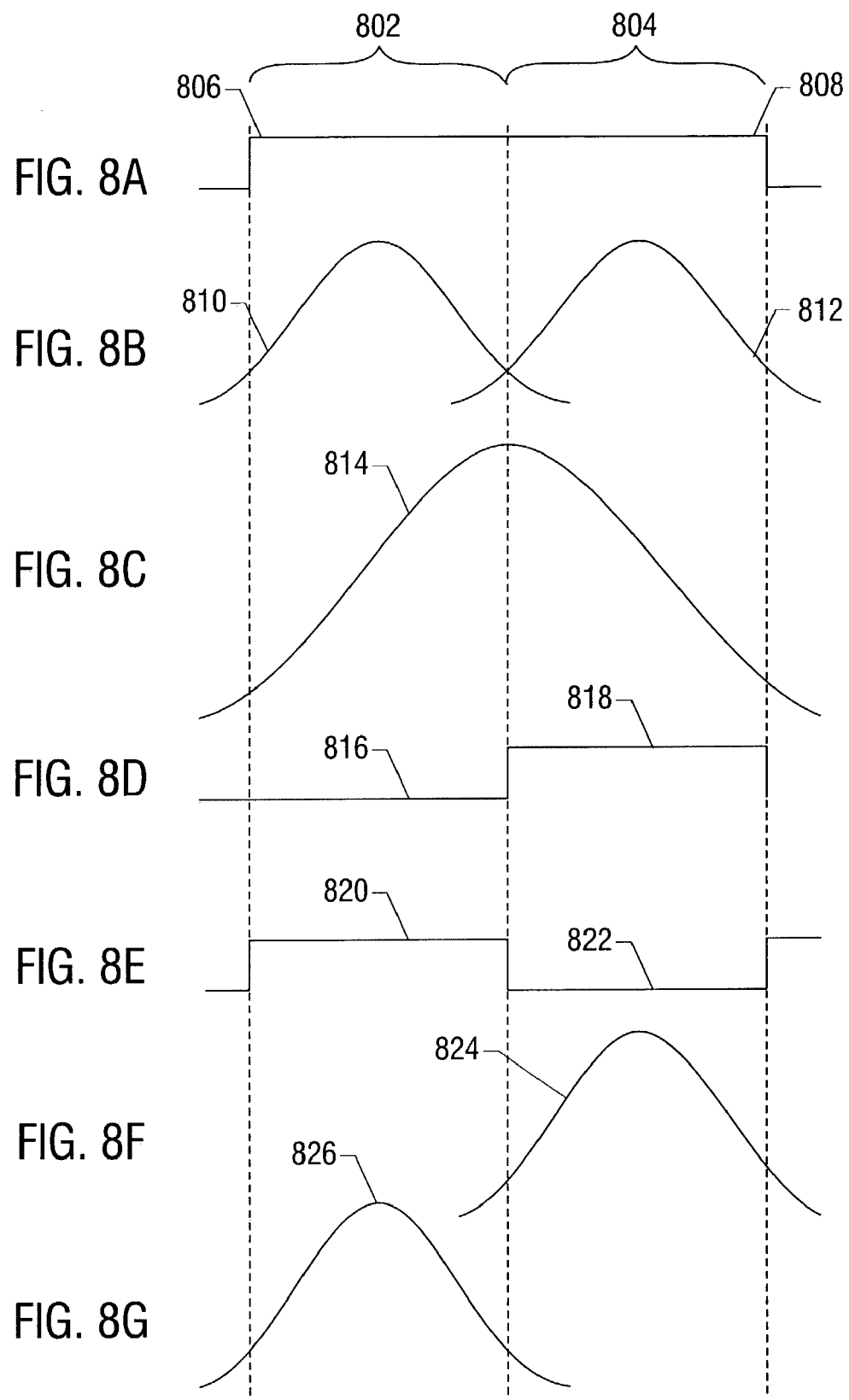
FIGS. 8A-8G illustrate how enhanced envelope peaking is introduced through the occurrence of the same BPSK symbol over two consecutive symbol periods on the same signal line.

FIG. 8A illustrates two successive symbols 802, 804 on the same signal line of a BPSK symbol mapper. This signal line may be either the I or the Q signal line. In each symbol period, the same BPSK symbol 806, 808 is provided. FIG. 8B illustrates the pulses which result from passing these two successive symbols through a raised cosine pulse-shaping filter. Pulse 810 results from symbol 806, and pulse 812 results from symbol 808.

FIG. 8C illustrates the pulse 814 that results from adding the two pulses 810 and 812. Enhanced envelope peaking is present since the peak of the pulse 814 exceeds that of either of the pulses 810 and 812.

FIGS. 8D and 8E illustrate the BPSK symbols that might ensue over these same symbol periods if orthogonal BPSK constellations were to be applied over successive symbol periods. FIG. 8D illustrates the symbols (or symbol components) that might be transmitted over the I signal line, while FIG. 8E does so for the Q signal line.

As illustrated in FIG. 8E, the symbol 806 of FIG. 8A is transmitted as symbol 820 over the Q signal line during symbol period 802. During symbol period 804, the Q signal line is zero, as indicated by numeral 822. As illustrated in FIG. 8D, the symbol 808 of FIG. 8A is transmitted over the I signal line as symbol 818 during symbol period 804. During symbol period 802, the I signal line is zero, as indicated by numeral 816.

FIG. 8F illustrates the pulse 824 that results from passing the symbol 818 through a raised cosine pulse shaping filter, and FIG. 8G illustrates the pulse 826 that results from passing the symbol 820 through a raised cosine pulse shaping filter. Since these pulses occur on different signal lines, and each of the signal lines will be zero during adjacent symbol periods, there is no possibility of pulses from adjacent symbol periods being combined to form a pulse with an increased peak such as the pulse 814 illustrated in FIG. 8C.

Figure 1:
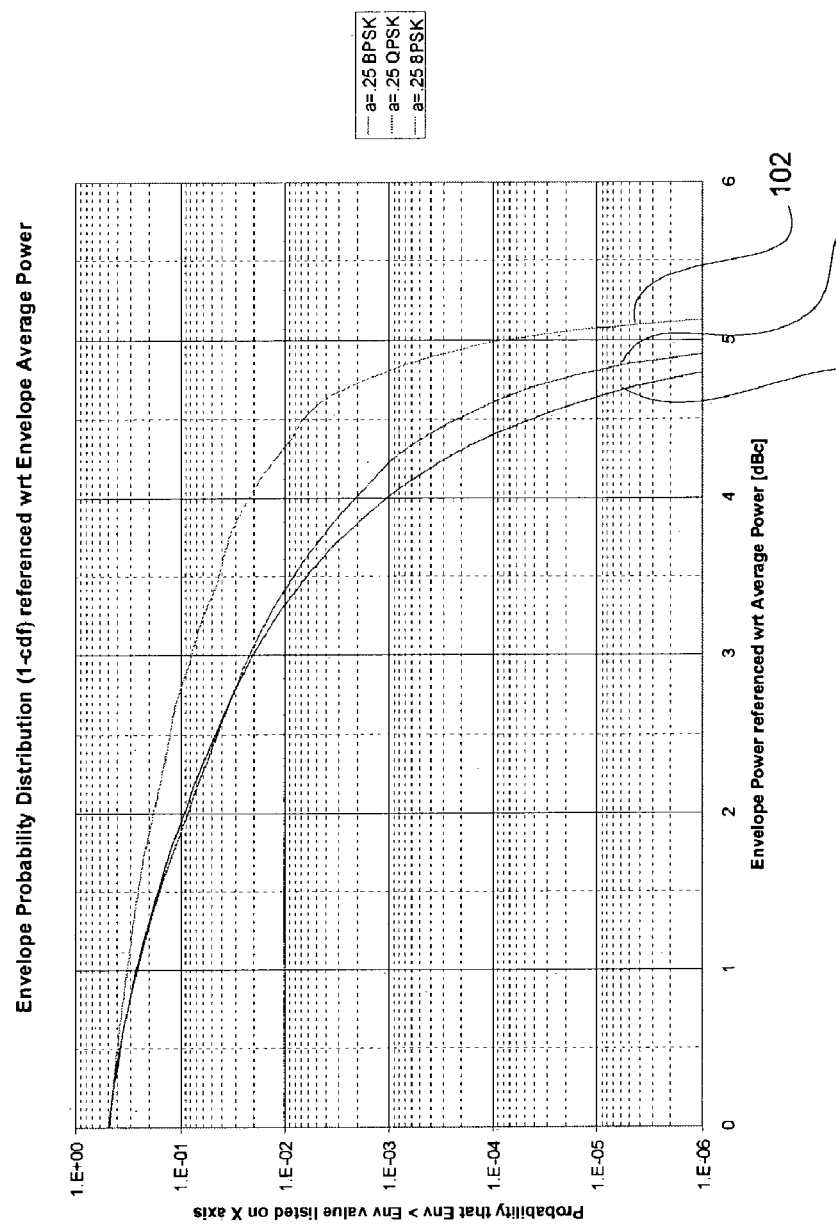
FIG. 1 is a diagram illustrated the enhanced envelope peaking that is introduced into BPSK modulated symbols by a root-raised cosine pulse-shaping filter compared with QPSK, and 8-PSK modulated symbols.
Figure 9:
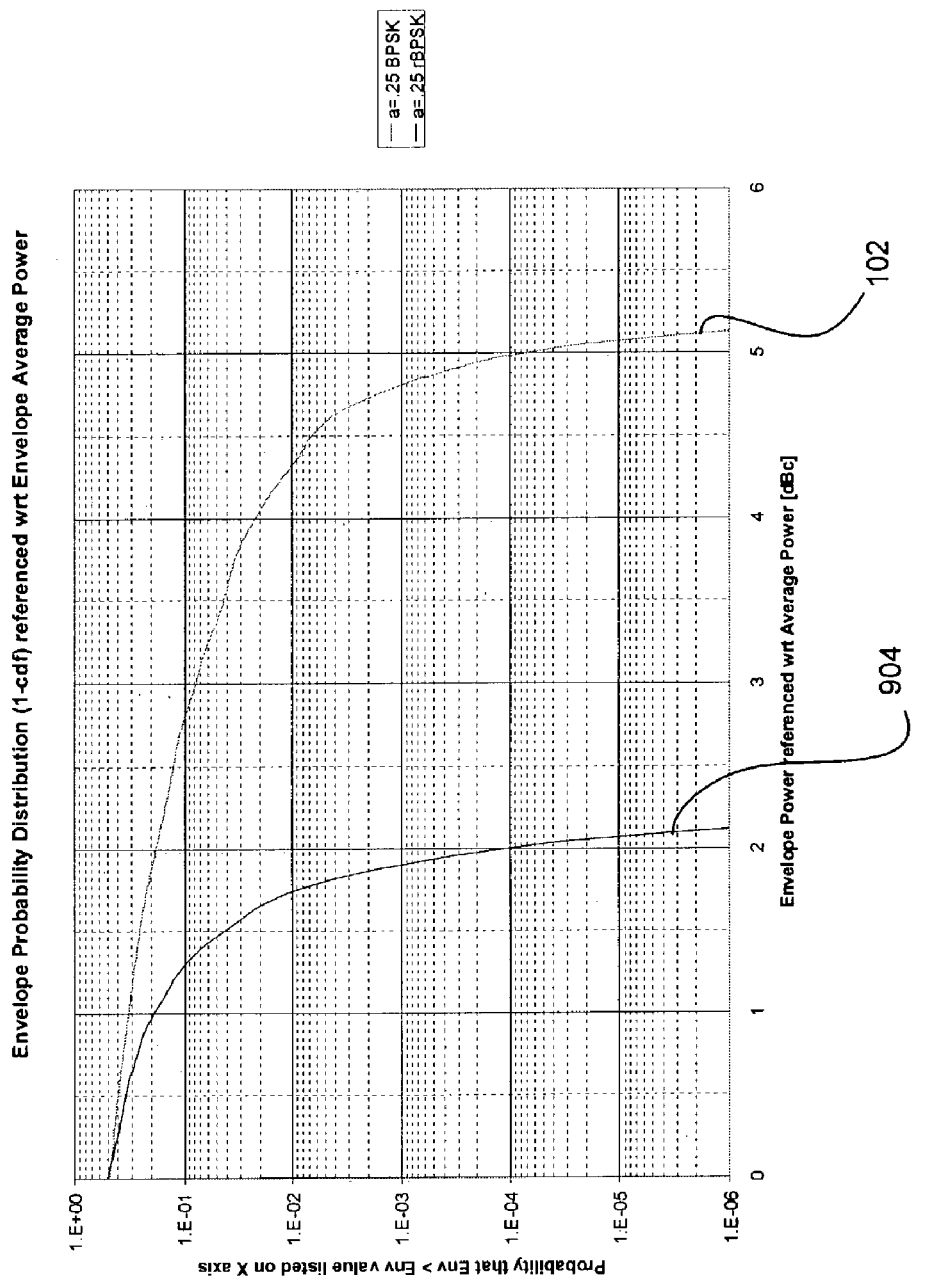
FIG. 9 illustrates the reduced envelope peaking that occurs through application of the invention compared with conventional BPSK symbol modulation.

FIG. 9 is a quantitative illustration of the reduction in envelope peaking that occurs through the use of orthogonal BPSK symbol constellations over successive symbol periods according to embodiments of the invention compared with conventional BPSK modulation schemes. Curve 102 represents the probability distribution of the envelope peak of a conventional BPSK-modulated signal referenced to average power (expressed in dBc) assuming passage through a root-raised cosine pulse shaping filter having a roll off factor of 0.25. (This is curve 102 as taken from FIG. 1). Curve 904 represents the probability distribution of the envelope peak of a BPSK-modulated signal referenced to average power in which orthogonal BPSK constellations are applied over successive symbol periods. Again, it is assumed that the signal has been passed through a root-raised cosine pulse shaping filter having a roll off factor of 0.25.

Assuming a fidelity criterion requiring clipping of not more than 1% of the signals involved, curve 904 indicates there is about 2.6 dB more average transmit power available through the use of orthogonal BPSK symbol constellations over successive symbol periods compared with conventional BPSK modulation schemes. Assuming a fidelity criterion requiring clipping of not more than 0.001% of the signals involved, curve 904 indicates about 3 dB more average transmit power available through the use of orthogonal BPSK symbol constellations over successive time periods compared with conventional BPSK modulation schemes. This increase in available transmit power translates into enhanced transmission range.

Figure 10:
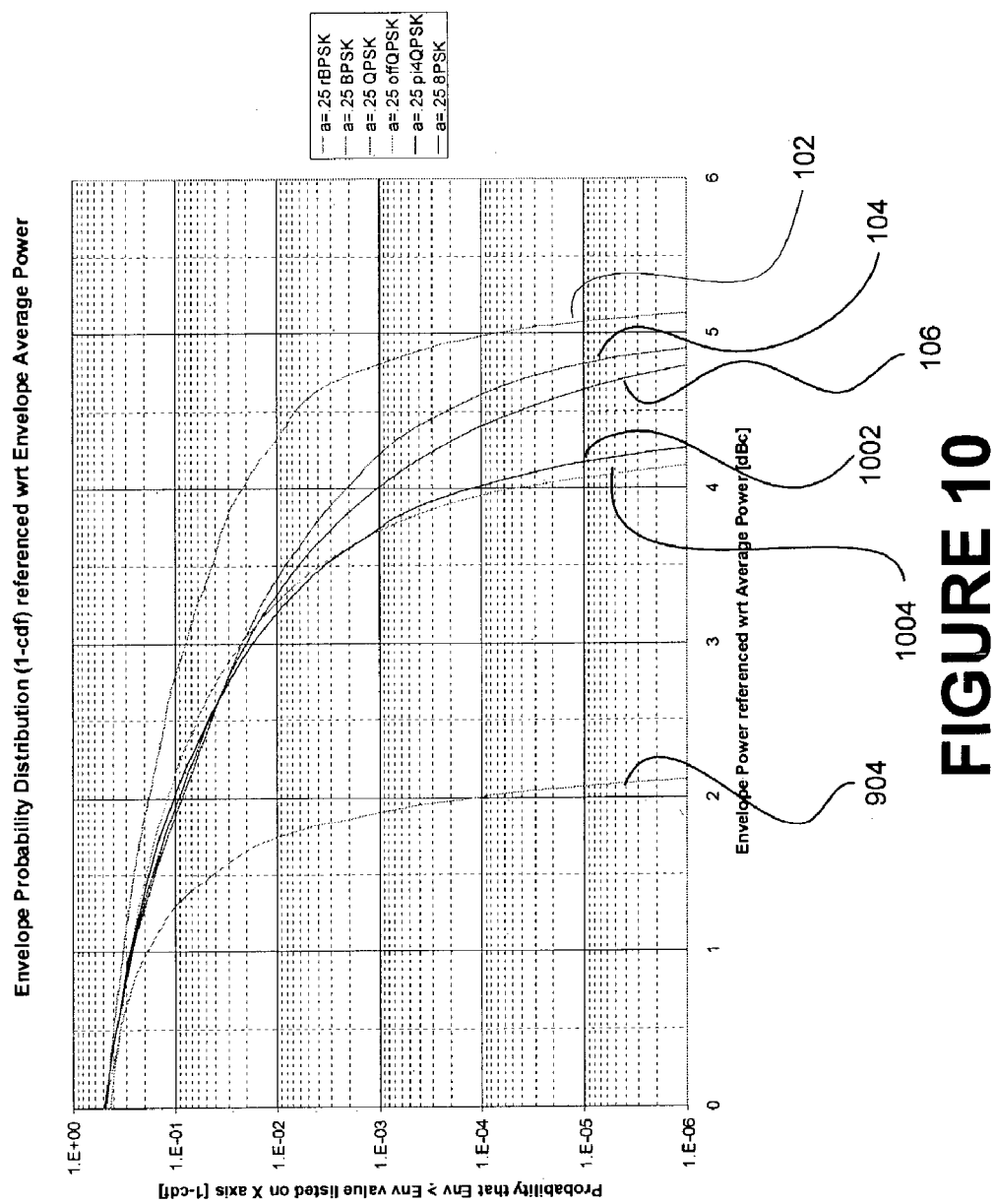
FIG. 10 illustrates the reduced envelope peaking that occurs through application of embodiments of the invention compared with offset QPSK, and π/4-shift differential QPSK modulated symbols.

FIG. 10 is a quantitative illustration of the increased transmit power which is available through the use of orthogonal BPSK symbol constellations over successive symbol periods compared with offset QPSK and π/4-DQPSK modulation schemes. The probability distribution of the peak to average power for offset QPSK modulation schemes is identified with numeral 1004, and the probability distribution of the peak to average power for π/4-DQPSK modulation schemes is identified with numeral 1002. At a fidelity criterion of 1%, the increase in transmit power which is available through the use of orthogonal BPSK constellations is about 1.5 dB. At a fidelity criterion of 0.001%, the increase in transmit power which is available is about 2.0 dB. Again, this increase in available transmit power translates into enhanced transmission range.

Figure 11:
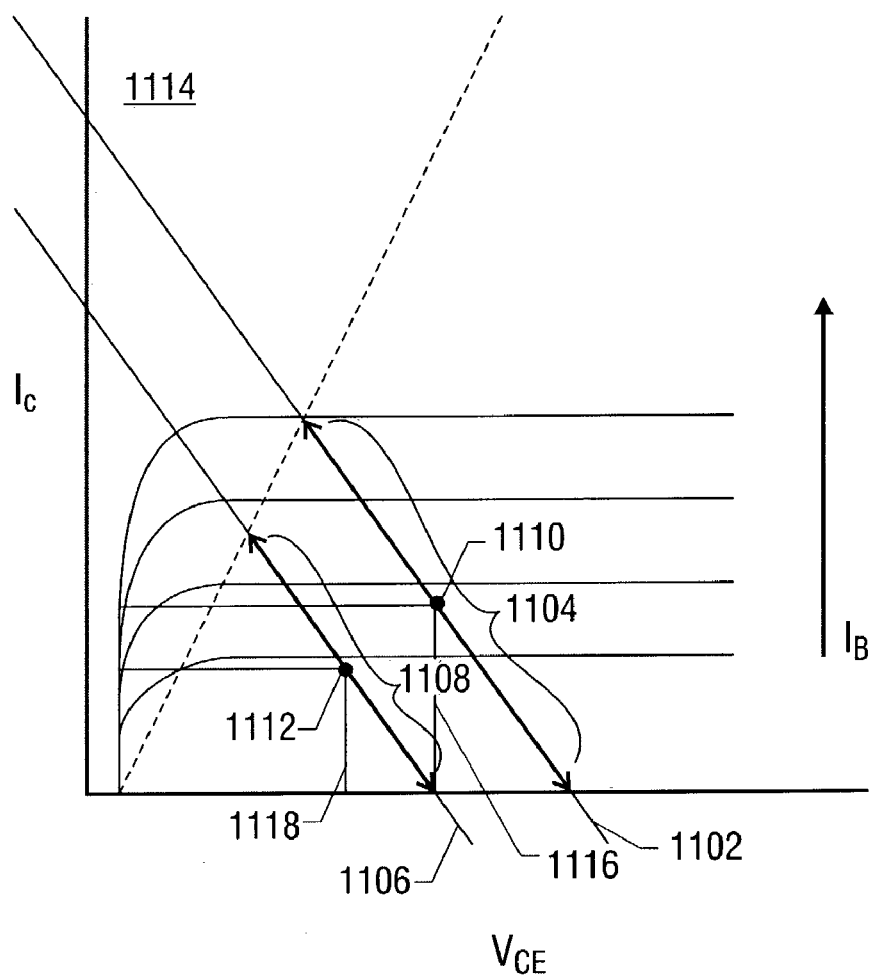
FIG. 11 is a diagram illustrating the reduction in quiescent power consumption that occurs in the transmit stage power amplifier through application of embodiments of the invention.

In addition to an increase in available average transmit power (and hence range), another benefit to the use of orthogonal BPSK constellations over successive symbol periods is reduced quiescent power consumption in the output stage power amplifier. FIG. 11 illustrates an example of the relationship between collector current ($I_C$) and collector-emitter voltage ($V_{CE}$) at different levels of base current ($I_B$) for a power amplifier. Line 1102 is an assumed load-line for the case in which conventional BPSK-modulated symbols are transmitted. The DC crossover point for $I_C$ is represented by point 1110, and the swing in the signal is represented by the range 1104. The non-linear region of operation of the power amplifier is identified with numeral 1114 and the swing of $I_C$ is constrained from entering the non-linear region 1114 beyond an amount called for by the applicable fidelity criterion. The quiescent power consumed by the power amplifier is given by the area of the box 1116.

Line 1106 is the assumed load-line for the case in which BSPK modulated symbols are transmitted assuming the application of orthogonal symbol constellations over successive symbol periods. The DC crossover point for $I_C$ is represented by point 1112 and the swing of $I_C$ is represented by the range 1108. The reduction of range 1108 compared to range 1104 results from the reduced envelope peaking which occurs through the application of orthogonal BPSK constellations over successive symbol periods. Because of this reduced swing, assuming the same fidelity criterion, the DC crossover point can be moved from 1110 to 1112 without violating the fidelity criterion. The quiescent power consumed by the power amplifier at point 1112 is given by the area of the box 1118. Since the area of box 1118 is less than that of box 11 16, it can be seen that the quiescent power which is consumed by the power amplifier has been reduced.

Figure 12:
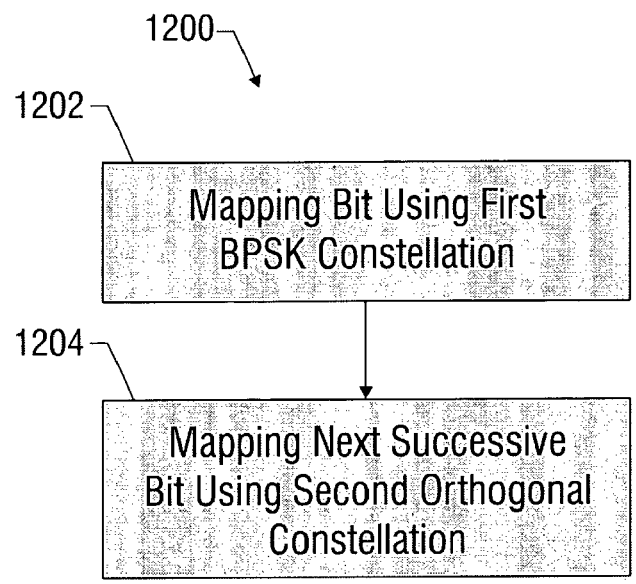
FIG. 12 is a flowchart of an embodiment of a method of mapping digital data into BPSK symbols wherein orthogonal BPSK symbol constellations are applied to successive bits of the digital data.

FIG. 12 is a flowchart of an embodiment 1200 of a method of mapping digital data into BPSK symbols. Step 1202 comprises mapping a bit of the digital data into a BPSK symbol using a first BPSK constellation. Step 1204 comprises mapping a next successive bit of the digital data into a BPSK symbol using a second BPSK constellation orthogonal to the first. The method may then branch back to step 1202 for additional iterations.

Figure 13:
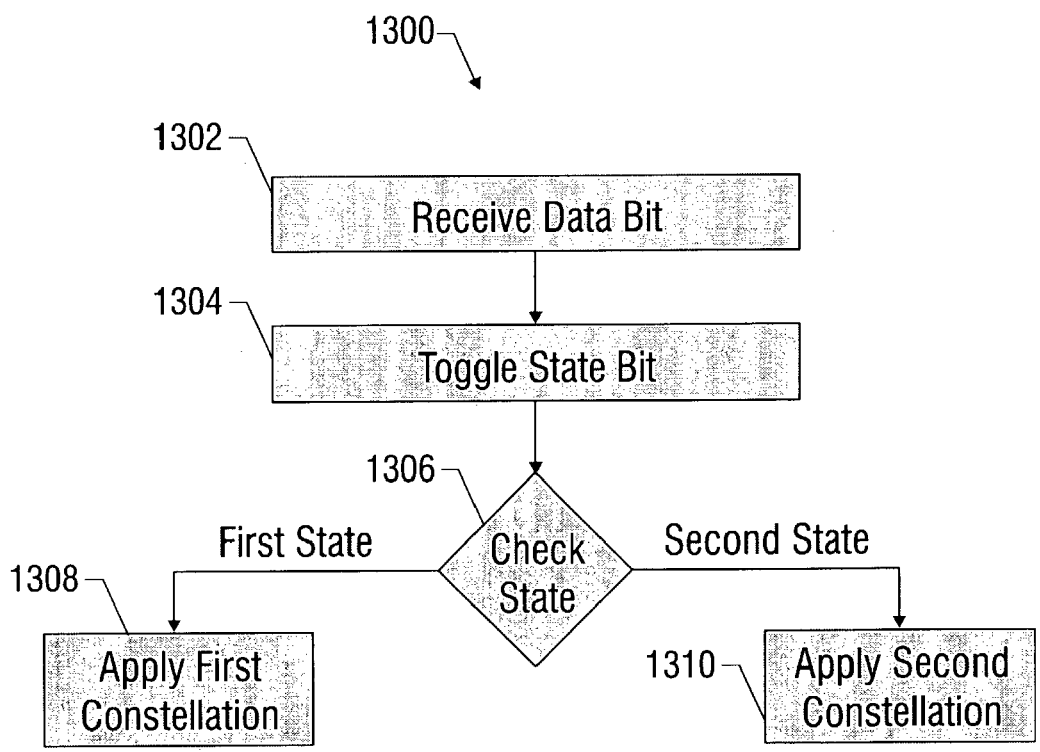
FIG. 13 is a flowchart of an embodiment of a method of mapping digital data into BPSK symbols in which toggling between first and second orthogonal BPSK symbol constellations is applied in mapping the data, as successive bits of the digital data are encountered.

FIG. 13 is a flowchart 1300 of an implementation of the embodiment of the method of FIG. 12. Step 1302 comprises receiving a bit of the digital data. Step 1304 comprises toggling a state bit between first and second states. If the state bit is in the first state, it is changed to the second state. If the state bit is in the second state, it is changed to the first state.

In query step 1306, it is queried whether the state bit is in the first or second states. If the first state, the method branches to step 1308. If the second state, the method branches to step 1310. In step 1308, the method applies a first BPSK constellation to map the data bit into a BPSK symbol. The method may then branch back to step 1302 for additional iterations.

In step 1310, the method applied a second BPSK constellation, orthogonal to the first, to map the data bit into a BPSK symbol. The method may then branch back to step 1302 for additional iterations.

In one example, the method of FIG. 13 toggles back and forth between applying the BPSK constellations of FIGS. 3A and 3B to digital data spread in frequency as produced from the spreader illustrated in FIG. 5, although it should be appreciated that other examples are possible, so that nothing in this particular example should be taken as limiting.

Figure 14:
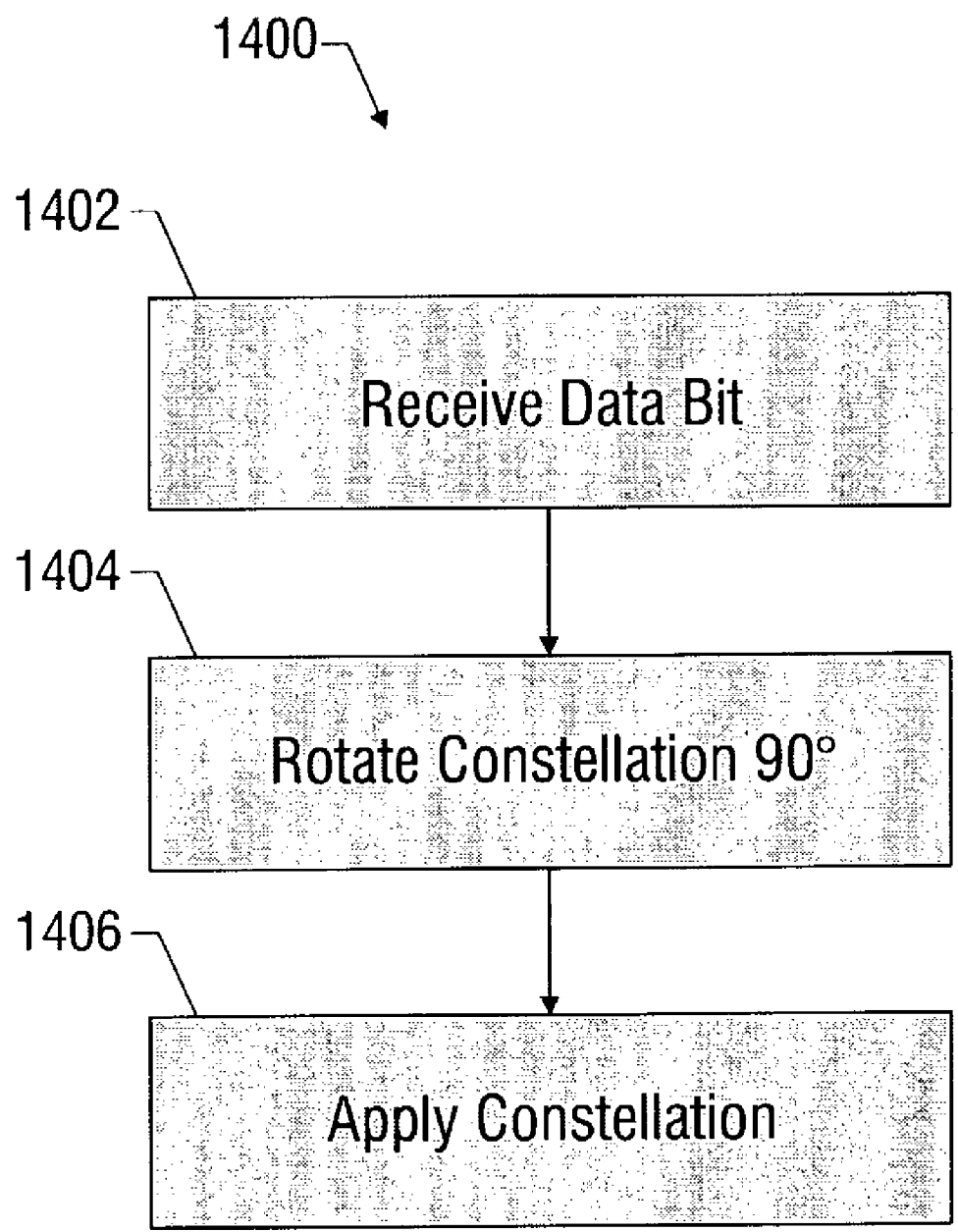
FIG. 14 is a flowchart of an embodiment of a method of mapping digital data into BPSK symbols in which the BPSK symbol constellation applied in mapping the data is progressively rotated by 90° as successive bits of the digital data are encountered.

FIG. 14 is a flowchart 1400 of a second implementation of the method of FIG. 12. Step 1402 comprises receiving a bit of the digital data. Step 1404 comprises rotating the BPSK constellation to be applied by 90°. Step 1406 comprises applying the rotated constellation from step 1404 to map the digital data bit into a BPSK symbol. The method may then branch back to step 1402 for one or more additional iterations.

In one example, the method of FIG. 14 successively applies the constellations illustrated in FIGS. 4A-4D as successive bits of differentially encoded digital data as produced from the differential encoder of FIG. 15 are encountered, although it should be appreciated that other examples are possible so that nothing in this example should be taken as limiting.

In any of the methods which have been described, the BPSK symbols may each comprise orthogonal in-phase (I) and quadrature (Q) components. Each of these methods may further comprises quadrature modulating a carrier signal with the I and Q components of successive BPSK symbols and transmitting the modulated signal over a wireless interface.

Additionally, in any of the methods which have been described, the digital data may be any digital data, including but not limited to baseband data representative of information to be transmitted, digital data which results from input data having been spread in frequency with a spreading sequence, such as a pseudo-random noise (PN) code, or digital data which results from differentially encoding input data.

While various embodiments, implementations and examples have been described, it will be apparent to those of ordinary skill in the art that many more embodiments, implementations and examples are possible that are within the scope of this invention. Consequently, the invention is not to be limited except in relation to the appended claims.

What is claimed is:

1. A system for mapping digital data into BPSK symbols comprising:
    first logic for mapping successive bits of the digital data into successive BPSK symbols using one or more BPSK constellations; and
    second logic for providing the one or more BPSK constellations to be applied by the first logic in mapping bits of the digital data into BPSK symbols such that orthogonal BPSK constellations are applied to successive bits of the digital data.

2. The system of claim 1 further wherein the second logic is configured to rotate the constellation to be applied by the first logic by 90° as successive bits of the digital data are encountered.

3. The system of claim 1 wherein each BPSK symbol comprises in-phase (I) and quadrature (Q) components, and the system further comprises a quadrature modulator for modulating a carrier signal with the I and Q components of the BPSK symbols and transmitting the modulated signal over a wireless interface.

4. The system of claim 1 further comprising a spreader for spreading input data with a spreading sequence to produce the digital data that are mapped by the first logic.

5. The system of claim 4 wherein the spreading sequence is a pseudo-random noise (PN) code.

6. The system of claim 1 further comprising a differential encoder for differentially encoding input data to produce the digital data which are mapped by the first logic.

7. A system for mapping digital data into BPSK symbols comprising:
    first logic for mapping successive bits of the digital data into successive BPSK symbols using one or more BPSK constellations;
    second logic for providing the one or more BPSK constellations to be applied by the first logic in mapping bits of the digital data into BPSK symbols such that orthogonal BPSK constellations are applied to successive bits of the digital data; and
    third logic for toggling a state bit between first and second states as successive bits of the digital data are encountered, wherein the second logic provides a first constellation to be applied by the first logic if the state bit is in the first state, and provides a second constellation orthogonal to the first to be applied by the first logic if the state bit is in the second state.

8. A method of mapping digital data into BPSK symbols comprising:
    mapping a bit of the digital data into a BPSK symbol using a first BPSK constellation; and
    mapping a next successive bit of the digital data into a BPSK symbol using a second BPSK constellation orthogonal to the first.

9. The method of claim 8 further comprising toggling between applying the first and second constellations as successive bits of the digital data are encountered.

10. The method of claim 8 further comprising successively rotating a BPSK constellation by 90° as successive bits of the digital data are encountered, and applying the rotated BPSK constellation to successive bits of the digital data.

11. The method of claim 8 wherein each BPSK symbol comprises in-phase (I) and quadrature (Q) components, further comprising quadrature modulating a carrier signal with the I and Q components of successive BPSK symbols and transmitting the modulated signal over a wireless interface.

12. The method of claim 8 further comprising spreading input data in frequency with a spreading sequence to result in the digital data which is mapped into BPSK symbols.

13. The method of claim 12 wherein the spreading sequence is a pseudo-random noise (PN) code.

14. The method of claim 8 further comprising differentially encoding input data to result in the digital data which is mapped into BPSK symbols.

15. A system for mapping digital data into BPSK symbols comprising:
    first means for mapping successive bits of the digital data into successive BPSK symbols using one or more BPSK constellations; and
    second means for providing the one or more BPSK constellations to be applied by the first means in mapping successive bits of the digital data into BPSK symbols such that orthogonal BPSK constellations are applied to successive bits of the digital data.

16. A method of mapping digital data into BPSK symbols comprising:
    a step for mapping a bit of the digital data into a BPSK symbol using a first BPSK constellation; and
    a step for mapping a next successive bit of the digital data into a BPSK symbol using a second BPSK constellation orthogonal to the first.

17. A method of mapping digital data into BPSK symbols comprising:
    mapping successive bits of the digital data into successive BPSK symbols using one or more BPSK constellations;
    providing the one or more BPSK constellations to be applied in mapping bits of the digital data into BPSK symbols such that orthogonal BPSK constellations are applied to successive bits of the digital data; and
    toggling a state bit between first and second states as successive bits of the digital data are encountered, wherein a first constellation is applied if the state bit is in the first state, and a second constellation orthogonal to the first is applied if the state bit is in the second state.

18. The method of claim 17 further comprising rotating the constellation to be applied by 90° as successive bits of the digital data are encountered.

19. The method of claim 17 wherein each BPSK symbol comprises in-phase (I) and quadrature (Q) components, and the method further comprises modulating a carrier signal with the I and Q components of the BPSK symbols and transmitting the modulated signal over a wireless interface.

20. The method of claim 17 further comprising spreading input data with a spreading sequence to produce the digital data.

* * * * *